Dec. 4, 1956     F. H. TENNIS     2,772,659
FISH FEEDING DEVICE
Filed Jan. 11, 1954
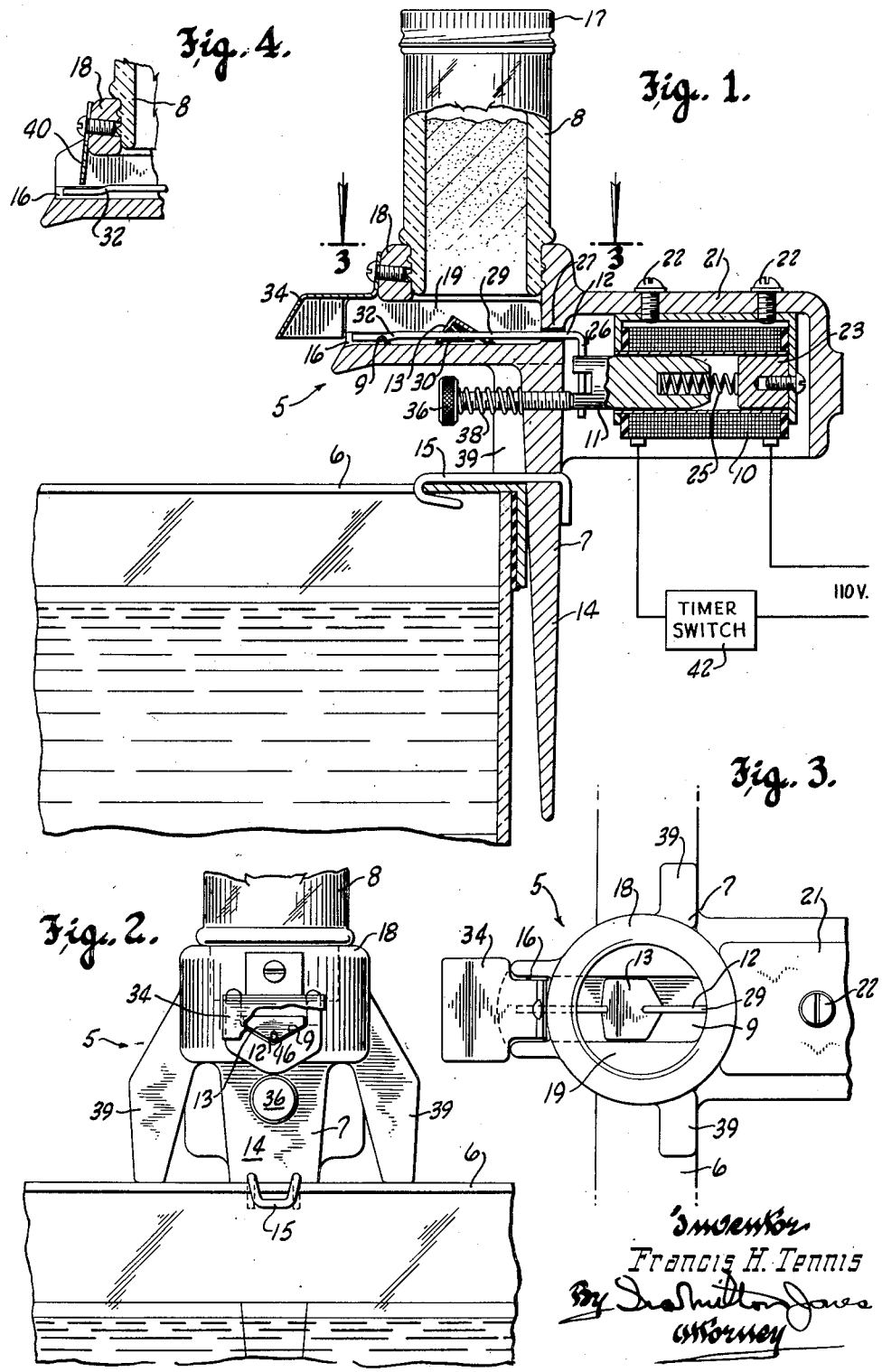

United States Patent Office 2,772,659
Patented Dec. 4, 1956

2,772,659

FISH FEEDING DEVICE

Francis H. Tennis, Milwaukee, Wis.

Application January 11, 1954, Serial No. 403,418

8 Claims. (Cl. 119—51)

This invention relates to dispensers for granular material, and refers more particularly to apparatus for automatically dispensing material such as fish food at regular timed intervals.

Pet store owners and breeders of tropical fish must feed their fish at fairly regular intervals, and at times when they cannot be present to perform this task personally it has heretofore been necessary for them to arrange with some other person to take care of the feeding. Even where the owner's absences may not create a problem, there may be such a large number of tanks into which measured quantities of fish food must be distributed at regular times that a dependable and inexpensive device which will perform this task automatically would eliminate a very considerable amount of inconvenience.

It is therefore an object of this invention to provide an inexpensive device by which granular fish food or the like may be automatically dispensed at regular intervals, and which will not require attention other than occasional filling of a container or hopper with material to be dispensed.

Another object of this invention resides in the provision of a fish food dispenser or the like by which granular material may be automatically dispensed on a regular time schedule and in accurately predetermined quantities, adjustable to the food requirements of each individual tank of fish.

With the above and other objects in view, which will appear as the description proceeds, this invention resides in the novel construction, combination and arrangement of parts susbtantially as hereinafter described and more particularly defined by the appended claims, it being understood that such changes in the precise embodiment of the hereindisclosed invention may be made as come within the scope of the claims.

The acompanying drawing illustrates two complete examples of the physical embodiments of the invention constructed according to the best modes so far devised for the practical application of the principles thereof, and in which:

Figure 1 is a vertical sectional view of the feeding device of this invention mounted on the wall of a fish tank;

Figure 2 is a front elevational view of the Figure 1 device;

Figure 3 is a view taken on the plane of the line 3—3 in Figure 1; and

Figure 4 is a fragmentary sectional view showing a modified embodiment of a part of the device of Figure 1.

Referring now more particularly to the accompanying drawing in which like numerals designate like parts throughout the several views, the numeral 5 designates generally a dispensing apparatus embodying the principles of this invention and which is shown as comprising a fish feeder mounted on a wall of a tank 6.

In general, the device comprises a substantially T-shaped body 7 on which the elements of the device are mounted and by which the device is held in place on a fish tank wall. On the body are a container 8 for fish food or other granular material opening downwardly into a trough 9, and a solenoid 10 having a reciprocable plunger 11 by means of which the device is actuated and which is connected by means of a link 12 with a movable pusher 13 in the trough.

More specifically, the body is formed as a unitary, substantially T-shaped member, preferably comprising a unitary casting, and the stem 14 of the body comprises a bracket adapted to extend downwardly along the outside of a fish tank wall. A wire anchor hook or retainer 15, one end of which is secured to the stem portion of the body, hooks over the tank wall to hold the device in place thereon. Preferably the anchor hook is fabricated from relatively soft wire so that it may be adjustably bent to permit the bracket to be secured to any type of fish tank or bowl.

The trough 9 forms one side of the cross bar of the T body and is open at its end remote from the stem of the T to provide a discharge mouth 16 through which granular material from the container may debouche into the tank.

The container is preferably made of glass so that the volume of its contents may be determined by inspection and it has a screw top 17 to facilitate filling it. Alternatively an inverted glass jar may be used, although this will necessitate removing the device from the fish tank each time it is filled so that the device may be inverted while the full container is attached right-side up. A collar 18 on the body is internally threaded to accommodate the correspondingly threaded lower end of the container and the interior of the container communicates directly with the trough through the feed passage 19 defined by the bore of the collar. The outlet of the feed passage is spaced inwardly from the mouth of the trough to prevent fish food from spilling out of the mouth of the trough at times when such discharge is not desired. The trough has a shallow V-shaped bottom so as to guide fish food from the container toward its open mouth.

The other portion of the cross bar of the substantially T-shaped body comprises a housing 21 for the solenoid 10 by which the device is actuated. In order to enable the solenoid housing to be formed integrally with the remainder of the housing casting without the necessity for complex coring, the housing may be open at its bottom as shown. The open bottom of the housing is also desirable in that it promotes cooling of the solenoid under conditions where the solenoid is energized substantially continuously. The solenoid is mounted in the housing, with its axis substantially parallel to the length of the trough, by means of screws 22 extending through one housing wall into threaded holes in the solenoid frame. The axially slidable plunger 11 of the solenoid is reciprocable toward and from an end stop 23 comprising a part of the solenoid frame and toward which the plunger is attracted when the solenoid is energized. The plunger is biased away from its attracted position in any suitable manner as, for example, by means of a compression spring 25 reacting between the plunger and the end stop 23.

The pusher 13 which serves to expel granular material from the trough comprises a substantially roof-shaped member, the lower edges of which closely fit the bottom of the trough, as best seen in Figure 2. The link or rod 12 by means of which reciprocation of the solenoid plunger is transmitted to the pusher is L-shaped, and one leg 26 of the L extends downwardly through a transverse bore in the solenoid plunger at the end thereof remote from the stop 23 while the other leg 29 of the rod extends through a closely fitting aperture in the wall 27 which separates the solenoid housing from the trough and is secured to the pusher. Preferably the rod extends through the pusher as shown and a tightly fitting wedge 30 of rubber or the like interposed between the slanting sides of the pusher and the rod constrains the pusher to reciprocate with the rod and thus with the solenoid plunger. It will be observed that the connection between the rod and the pusher disposes the pusher adjacent to the outlet of the feed passage 19. At its end remote from the solenoid the rod may be bent or displaced slightly as at 32 to enable it to break up adhesions between particles of granular matter as it reciprocates therethrough.

It will be apparent that when the solenoid is energized and the plunger is drawn to its attracted position the pusher is likewise moved away from the mouth of the trough, and upon de-energization of the solenoid the plunger will move abruptly in the opposite direction in response to the bias of the spring 25 thereon, thereby impelling the pusher toward the mouth of the trough so that the pusher will expel from the trough a quantity of the granular material therein. A deflector 34 spaced outwardly of the mouth of the trough prevents the granular material from being broadcast over an excessively large area as it is expelled from the trough and deflects it downwardly onto the surface of the water therebeneath.

The quantity of feed which will be expelled from the dispenser at each cycle of operation thereof is determined by an adjusting screw 36 threaded through the stem or bracket portion of the body to have its inner end engageable by the end of the solenoid plunger remote from the stop 23. As the adjusting screw is turned inwardly, the stroke of the solenoid plunger, and consequently of the pusher, will be shortened, and therefore a lesser quantity of granular material will be expelled at each operation. A compression spring 38 reacting between the head of the screw and the stem portion of the body prevents the screw from creeping out of any position of adjustment to which it may be set.

To hold the screw above the upper edge of the tank wall on which the device is mounted, the body is provided with integral vertical ribs 39 spaced to opposite sides of the screw and the lower edges of which comprise downwardly facing abutments spaced beneath the adjusting screw and engageable with the upper edge of the tank wall.

As an alternative to adjustment of the pusher stroke, a stripper plate 40 (see Fig. 4) may be adjustably secured at the mouth of the trough to regulate the size of the aperture through which the granular material is expelled and thus control the amount of granular material dispersed at each operation. Since the stripper plate reduces the size of the orifice through which the material is expelled, there is less danger of widespread dispersal of the material with the stripper plate than without it, and consequently the deflector 34 is not necessary when the stripper plate is employed.

In operation, the container is filled with granular fish food and the device, with the container in place thereon, is mounted on the edge of a fish tank, the anchor hook 15 being bent as required to hold the bracket in place. The solenoid is then connected with a source of current through a time switch 42 of any of a number of well-known types, as, for example, a switch of the type by which a radio receiver is turned on and off at predetermined times. The timer may be arranged to energize the solenoid momentarily at whatever interval is determined to be desirable for dispensing food, or the timer may be of such type that the solenoid is normally energized and the flow of current thereto is momentarily interrupted at times when expulsion of food from the device is desired. In the latter event, of course, the device will consume current substantially continuously, but the resultant slight heating of the solenoid may be desirable in order to keep the granular material dry and thus prevent it from lumping.

From the foregoing description, taken together with the accompanying drawing, it will be apparent that this invention provides a simple, compact and economical device for automatically dispensing granular material such as fish food at regular predetermined intervals and which, moreover, enables a predetermined quantity of such material to be dispensed at each such interval.

What I claim as my invention is:

1. Apparatus for periodically dispensing a quantity of granular material such as fish food, said apparatus comprising: a body including a supporting bracket for mounting the apparatus above a location to which granular material is to be dispensed; means on said body defining a downwardly opening feed passage for granular material; a substantially horizontal trough on said body into which said feed passage opens, said trough having an open discharge mouth at one end thereof spaced a distance to one side of the outlet of said feed passage; a pusher movably mounted in the body for reciprocation in the trough toward and from the mouth thereof along a path adjacent to the outlet of the feed passage but spaced a distance therebeneath so that the pusher is incapable of blocking communication between the feed passage and the trough; means yieldingly biasing the pusher in one of its directions of reciprocation; and a solenoid mounted on the body and having a reciprocable plunger connected with the pusher to reciprocate the pusher so that in consequence of each cycle of energization and de-energization of the solenoid the pusher is moved away from and toward the mouth of the trough, for expelling a quantity of granular material out of the trough.

2. Apparatus for periodically dispensing granular material, such as fish food, said apparatus comprising: means defining a downwardly opening feed passage for granular material; a substantially horizontal trough into which the outlet of said passage opens, said trough having one open end providing a discharge mouth spaced a distance to one side of the outlet of said passage; a pusher reciprocably mounted in the trough adjacent the outlet of said feed passage for movement lengthwise of the trough toward and from its discharge mouth along a path spaced a distance beneath the outlet of the feed passage; a solenoid having a plunger reciprocable toward and from an attracted position to which the plunger is drawn in consequence of energization of the solenoid; and a connection between the solenoid plunger and the pusher constraining the pusher to reciprocate with the plunger so that the pusher can expel a quantity of granular material out of the mouth of the trough as it moves toward the same during each cycle of energization and de-energization of the solenoid.

3. Apparatus for periodically dispensing granular material such as fish food, said apparatus comprising: a substantially horizontal trough open at one end to provide a discharge mouth; a container for granular material above the trough having an outlet opening downwardly into the trough inwardly of said discharge mouth; a reciprocable pusher in said trough movable lengthwise thereof toward and from said mouth along a path spaced a distance beneath the outlet of the container; a solenoid having a reciprocable plunger biased in one direction of reciprocation and movable in the other direction against such bias upon energization of the solenoid, said solenoid being mounted in substantially end-to-end alignment with the trough; and a link connected between the solenoid plunger and the pusher constraining the plunger and pusher to reciprocate in unison so that in consequence of each cycle of energization and de-energization of the solenoid the pusher can expel a quantity of granular material from the discharge mouth as it moves toward the same.

4. Apparatus for periodically dispensing granular material such as fish food, said apparatus comprising: a substantially T-shaped body, the stem portion of which comprises a bracket adapted to be mounted on one wall of a fish tank; a substantially horizontal trough comprising one side of the cross-bar of the T-shaped body, the end of said trough remote from the stem of the T being open to provide a discharge mouth; means on said body defining a container for granular material and a downwardly extending feed passage having an outlet communicating said container with the trough inwardly of the discharge mouth of the trough; a solenoid mounted on the other side of the cross-bar of the body, said solenoid having a plunger reciprocable toward and from the stem of the T in consequence of energization and de-energization of the solenoid and yieldingly biased in one direction of reciprocation; a pusher movable in the trough along a path spaced a distance beneath the outlet of said feed passage; and a link connecting the solenoid plunger with the pusher to constrain the pusher to reciprocate with the plunger, so that the pusher can expel a quantity of granular material from the trough as it moves toward the mouth of the trough during each cycle of solenoid energization and de-energization.

5. The apparatus of claim 4, further characterized by an adjusting screw threaded into the body and having an end engageable with one end of the solenoid plunger to define one limit of reciprocation of the plunger and thus govern the length of its stroke, to thereby regulate the amount of granular material expelled from the mouth of the trough during each cycle of energization and de-energization of the solenoid.

6. The apparatus of claim 4, further characterized by a stripper plate mounted at the mouth of the trough and partially obstructing the same, said stripper plate being adjustable to regulate the size of the orifice at said mouth and thus govern the amount of granular material expelled from the trough at each operation.

7. Apparatus for periodically dispensing a quantity of granular material such as fish food, said apparatus comprising: a body having an upright feed passage opening to its top; means in the body defining a trough at the bottom of said feed passage, substantially crosswise of the feed passage, said trough having a discharge mouth opening to one side of the body; a pusher carried by the body and having a portion movable in the trough toward and from the discharge mouth thereof, adjacent to the intersection of the trough and the feed passage, said pusher having less height than the trough whereby the latter is at all times communicated with the feed passage; and an electromagnetic actuator for said pusher carried by the body for moving the pusher toward and from the discharge mouth of the trough to thus effect discharge of granular feed from the trough in consequence of operation of the actuator.

8. Apparatus for periodically dispensing a quantity of granular material such as fish food, said apparatus comprising: a body having a bracket adapted to engage a wall of a fish tank; a trough on the body connected with the bracket and spaced above the portion of the bracket which engages a wall of a fish tank, said trough having an open end which provides a discharge mouth; means on the body providing a reservoir for granular material and a feed passage having an outlet communicating said reservoir with a part of the trough spaced from its discharge mouth; and electromagnetically operated pusher means including a pusher beneath and spaced from the outlet of the feed passage for transferring relatively small increments of granular material from said part of the trough out of the discharge mouth of the trough.

References Cited in the file of this patent

UNITED STATES PATENTS

| | | |
|---|---|---|
| 632,171 | Bolinski | Aug. 29, 1899 |
| 991,677 | Wall | May 9, 1911 |
| 1,535,341 | Riley | Apr. 28, 1925 |
| 1,989,298 | Tingley | Jan. 29, 1935 |
| 2,130,466 | Lapierre | Sept. 20, 1938 |
| 2,325,441 | Tucker et al. | July 27, 1943 |
| 2,538,413 | Chard | Jan. 16, 1951 |
| 2,725,852 | Cramer | Dec. 6, 1955 |